(12) United States Patent
Tanaka et al.

(10) Patent No.: US 10,634,303 B2
(45) Date of Patent: Apr. 28, 2020

(54) OPTICAL UNIT

(71) Applicant: KOITO MANUFACTURING CO., LTD., Tokyo (JP)

(72) Inventors: Hidetada Tanaka, Shizuoka (JP); Kentarou Murakami, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/713,163

(22) Filed: Sep. 22, 2017

(65) Prior Publication Data

US 2018/0112845 A1 Apr. 26, 2018

(30) Foreign Application Priority Data

Oct. 24, 2016 (JP) .................... 2016-208063

(51) Int. Cl.
*F21S 41/675* (2018.01)
*F21S 41/148* (2018.01)
(Continued)

(52) U.S. Cl.
CPC .......... *F21S 41/675* (2018.01); *B60Q 1/0076* (2013.01); *B60Q 1/143* (2013.01); *F21S 41/147* (2018.01); *F21S 41/148* (2018.01); *F21S 41/151* (2018.01); *F21S 41/255* (2018.01); *F21S 41/321* (2018.01); *F21S 41/336* (2018.01); *F21S 41/663* (2018.01); *B60Q 2300/054* (2013.01); *B60Q 2300/056* (2013.01); *B60Q 2300/322* (2013.01);
(Continued)

(58) Field of Classification Search
CPC ........ F21S 41/147; F21S 41/148; F21S 41/30; F21S 41/32; F21S 41/321; F21S 41/336; F21S 41/663; F21S 41/675
See application file for complete search history.

(56) References Cited

U.S. PATENT DOCUMENTS

2009/0015388 A1* 1/2009 Yagi ..................... B60Q 1/0035
340/435
2013/0038736 A1* 2/2013 Yamamura ............. B60Q 1/143
348/148
(Continued)

FOREIGN PATENT DOCUMENTS

CN 103492792 A 1/2014
CN 103867985 A 6/2014
(Continued)

OTHER PUBLICATIONS

English Machine Translation of EP 2746644 provided by Espacenet (Year: 2014).*
(Continued)

*Primary Examiner* — Zheng Song
(74) *Attorney, Agent, or Firm* — Osha Liang LLP

(57) ABSTRACT

The control part controls a timing of changing the light emission intensity of the first light source and a timing of changing the light emission intensity of the second light source such that a first light-shielding portion is formed in a part of the first irradiation pattern, a second light-shielding portion is formed in a part of the second irradiation pattern so as to overlap with the first light-shielding portion, and a range of the first light-shielding portion and a range of the second light-shielding portion are deviated from each other.

9 Claims, 15 Drawing Sheets

(51) Int. Cl.
*F21S 41/32* (2018.01)
*F21S 41/151* (2018.01)
*F21S 41/33* (2018.01)
*F21S 41/255* (2018.01)
*B60Q 1/14* (2006.01)
*F21S 41/663* (2018.01)
*F21S 41/147* (2018.01)
*B60Q 1/00* (2006.01)
*F21W 102/145* (2018.01)

(52) U.S. Cl.
CPC ...... *B60Q 2300/41* (2013.01); *B60Q 2300/42* (2013.01); *F21W 2102/145* (2018.01)

(56) References Cited

U.S. PATENT DOCUMENTS

| | | | |
|---|---|---|---|
| 2013/0121012 A1* | 5/2013 | Sato | B60Q 1/24 362/520 |
| 2014/0042325 A1* | 2/2014 | Yamamura | B60Q 1/0023 250/347 |
| 2014/0043805 A1* | 2/2014 | Yamamura | F21S 10/026 362/231 |
| 2014/0092618 A1* | 4/2014 | Yagi | G02B 26/10 362/512 |
| 2015/0307018 A1 | 10/2015 | Shibata et al. | |
| 2016/0250964 A1 | 9/2016 | Takagaki et al. | |
| 2017/0159903 A1 | 6/2017 | Yamamura | |
| 2017/0159904 A1 | 6/2017 | Yamamura | |
| 2017/0185855 A1 | 6/2017 | Yamamura | |

FOREIGN PATENT DOCUMENTS

| | | | | |
|---|---|---|---|---|
| CN | 105922928 A | | 9/2016 | |
| EP | 2746644 | * | 6/2014 | ............ F21S 41/143 |
| WO | 2011/129105 A1 | | 10/2011 | |

OTHER PUBLICATIONS

Office Action issued in Chinese Application No. 201710840313.1, dated Jan. 24, 2019 (18 pages).

* cited by examiner

OPTICAL UNIT

CROSS-REFERENCE TO RELATED APPLICATION

This application claims priority from Japanese Patent Application No. 2016-208063 filed on October 24, the entire contents of which are incorporated herein by reference.

FIELD

The present invention relates to an optical unit, and particularly, to an optical unit used for a vehicle lamp.

BACKGROUND

Recently, an optical unit including a rotary reflector that rotates in one direction around its rotation axis while reflecting light emitted from a light source has been devised (see JPWO 2011129105 (A1)).

This optical unit can form a light distribution pattern partially shielded by controlling the timing of the turning on/off of the light source while scanning the front side of the optical unit with a light source image.

By the way, when the change in brightness in the vicinity of a bright/dark boundary of a light-shielding portion formed in a part of a light distribution pattern is sharp, a sense of discomfort may be given to a viewer of the light distribution pattern. On the other hand, when the change in brightness in the vicinity of the bright/dark boundary is too gentle, the range of the light-shielding portion becomes unclear, and hence, there is a concern that visibility of an end portion of an irradiation region adjacent to the light-shielding portion is deteriorated.

SUMMARY

One or more embodiments of the present invention provides a new optical unit capable of alleviating the change in brightness in the vicinity of a bright/dark boundary of a light-shielding portion.

An optical unit according to one or more embodiments of the present invention includes a first light source configured to emit a first irradiation beam, a second light source configured to emit a second irradiation beam, a scanning part which is configured to form a first irradiation pattern by scanning the first irradiation beam, form a second irradiation pattern by scanning the second irradiation beam, and form a light distribution pattern by overlapping the first irradiation pattern and the second irradiation pattern, and a control part configured to control light emission intensity of the first light source and light emission intensity of the second light source. The control part controls a timing of changing the light emission intensity of the first light source and a timing of changing the light emission intensity of the second light source such that a first light-shielding portion is formed in a part of the first irradiation pattern, a second light-shielding portion is formed in a part of the second irradiation pattern so as to overlap with the first light-shielding portion, and a range of the first light-shielding portion and a range of the second light-shielding portion are deviated from each other.

Accordingly, since the regions adjacent to both ends of the light-shielding portion are scanned only by either the first irradiation beam or the second irradiation beam, the change in brightness in the vicinity of the bright/dark boundary of the light-shielding portion can be made in a stepwise manner. Here, the change in brightness is, for example, a function of a change in brightness with respect to a change in position of the scanning direction in the light distribution pattern.

The control part may be configured to be capable of executing a first light-shielding mode in which a deviation of the range of the first light-shielding portion and the range of the second light-shielding portion is relatively large, and a second light-shielding mode in which a deviation of the range of the first light-shielding portion and the range of the second light-shielding portion is relatively small. In this way, the change in brightness in the vicinity of the bright/dark boundary of the light-shielding portion can be made relatively small in the first light-shielding mode and can be made relatively large in the second light-shielding mode.

The control part may be configured to be capable of executing the first light-shielding mode or the second light-shielding mode in accordance with a travelling state of an own vehicle or a state in front of the own vehicle. In this way, the change in brightness in the vicinity of the bright/dark boundary of the light-shielding portion can be made different in accordance with the situation in which the optical unit is used.

The scanning part may be, for example, a rotary reflector that rotates in one direction around its rotation axis while reflecting light emitted from the first light source and the second light source.

According to one or more embodiments of the present invention, an optical unit is configured to form a light distribution pattern by scanning the light respectively emitted from a plurality of light sources. The optical unit is configured to form a light-shielding portion in a part of the light distribution pattern by controlling the timing of turning of/off the light sources. The optical unit is configured to form a light distribution pattern so that it becomes gradually brighter as it goes away from the light-shielding portion.

Accordingly, since the light is scanned to the regions adjacent to both ends of the light-shielding portion so that it becomes gradually brighter away from the light-shielding portion, the change in brightness in the vicinity of the bright/dark boundary of the light-shielding portion can be made in a stepwise manner.

Meanwhile, any combination of the above-described components and the transformation of the expression of the present invention among methods, devices and systems or the like are also within the scope of the present invention. Further, any suitable combination of the above-described parts can be also included in the scope of the invention to be sought by the present patent application.

According to the present invention, it is possible to alleviate a change in brightness in the vicinity of the bright/dark boundary of the light-shielding portion.

EMBODIMENTS

Figure 1:
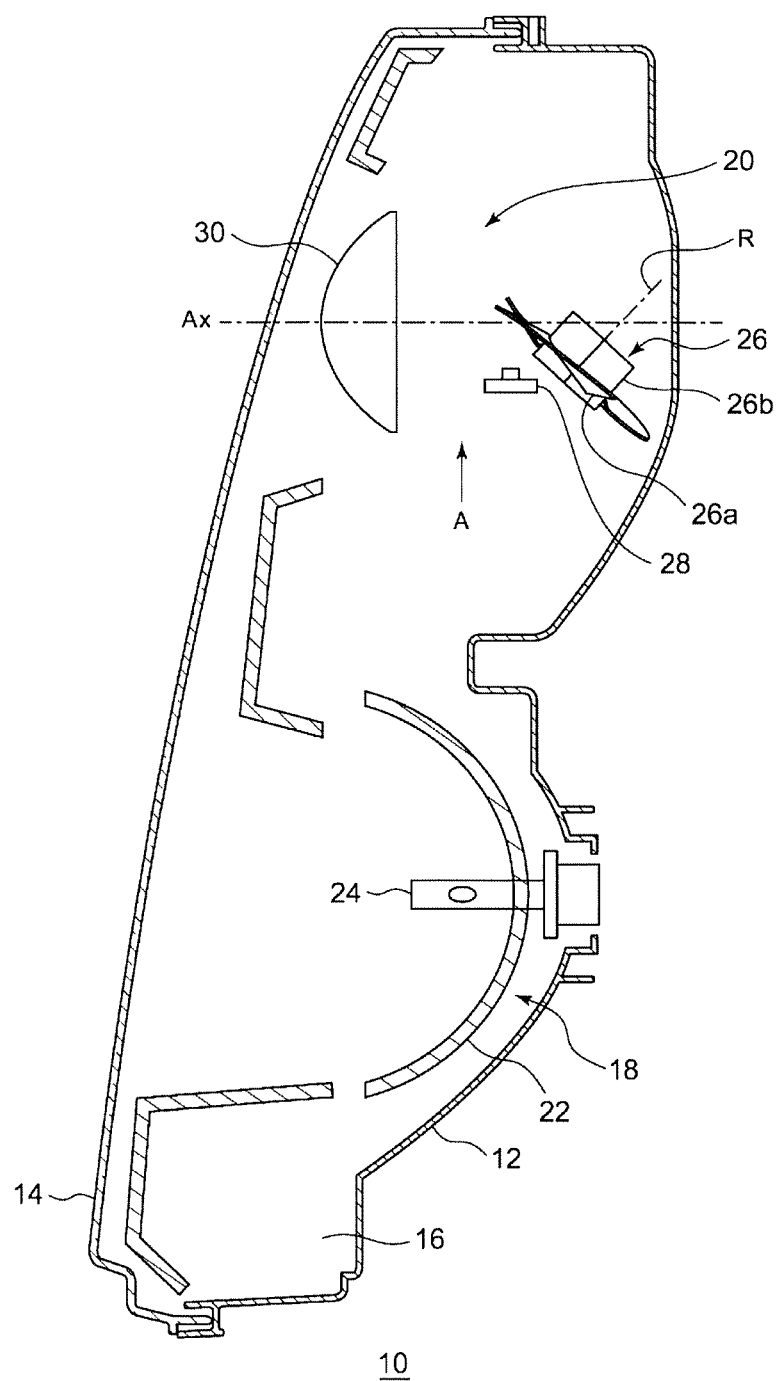
FIG. 1 is a horizontal sectional view of a vehicle headlamp according to a reference example.

Hereinafter, based on reference examples and embodiments, the present invention will be described with reference to the drawings. The same or similar constituent elements, members or processes shown in each drawing are denoted by the same reference numerals, and the repeated explanations are omitted as appropriate. Further, the embodiments are not intended to limit the invention but are examples. All the features described in the embodiments and combinations thereof are not necessarily essential to the invention.

An optical unit of the present invention can be used for various vehicle lamps. Hereinafter, a case where the optical unit of the present invention is applied to a vehicle headlamp of a vehicle lamp will be described.

(Reference Example)

First, a basic configuration and a basic operation of an optical unit according to the present embodiment will be described with reference to a reference example. FIG. 1 is a horizontal sectional view of a vehicle headlamp according to the reference example. A vehicle headlamp 10 shown in FIG. 1 is a right headlamp mounted on the right side of a front end portion of an automobile and has the same structure as a left headlamp mounted on the left side except that it is bilaterally symmetrical with the left headlamp. Therefore, hereinafter, the right vehicle headlamp 10 will be described in detail, and the description of the left vehicle headlamp will be omitted.

As shown in FIG. 1, the vehicle headlamp 10 includes a lamp body 12 having a recess opening forward. The front opening of the lamp body 12 is covered with a transparent front cover 14, thereby forming a lamp chamber 16. The lamp chamber 16 functions as a space in which two lamp units 18, 20 are accommodated in a state of being arranged side by side in a vehicle width direction.

Out of the lamp units, the lamp unit disposed on the outer side, i.e., the lamp unit 20 disposed on the upper side in FIG. 1 in the right vehicle headlamp 10 is a lamp unit including a lens. The lamp unit 20 is configured to irradiate a variable high beam. On the other hand, out of the lamp units, the lamp unit disposed on the inner side, i.e., the lamp unit 18 disposed on the lower side in FIG. 1 in the right vehicle headlamp 10 is configured to irradiate a low beam.

The low-beam lamp unit 18 includes a reflector 22, a light source bulb (incandescent bulb) 24 supported on the reflector 22, and a shade (not shown). The reflector 22 is supported tiltably with respect to the lamp body 12 by known means (not shown), for example, means using an aiming screw and a nut.

As shown in FIG. 1, the lamp unit 20 includes a rotary reflector 26, an LED 28, and a convex lens 30 as a projection lens disposed in front of the rotary reflector 26. Meanwhile, instead of the LED 28, a semiconductor light emitting element such as an EL element or an LD element can be used as the light source. Particularly for the control of shielding a part of a light distribution pattern (to be described later), it is desirable to use a light source capable of precisely performing the turning on/off in a short time. Although the shape of the convex lens 30 can be appropriately selected according to the light distribution characteristics such as light distribution patterns or illuminance patterns required, an aspherical lens or a free-curved surface lens is used. In the reference example, an aspherical lens is used as the convex lens 30.

The rotary reflector 26 rotates in one direction around its rotation axis R by a drive source such as a motor (not shown). Further, the rotary reflector 26 has a reflecting surface configured to reflect light emitted from the LED 28 while rotating and to form a desired light distribution pattern.

Figure 2:
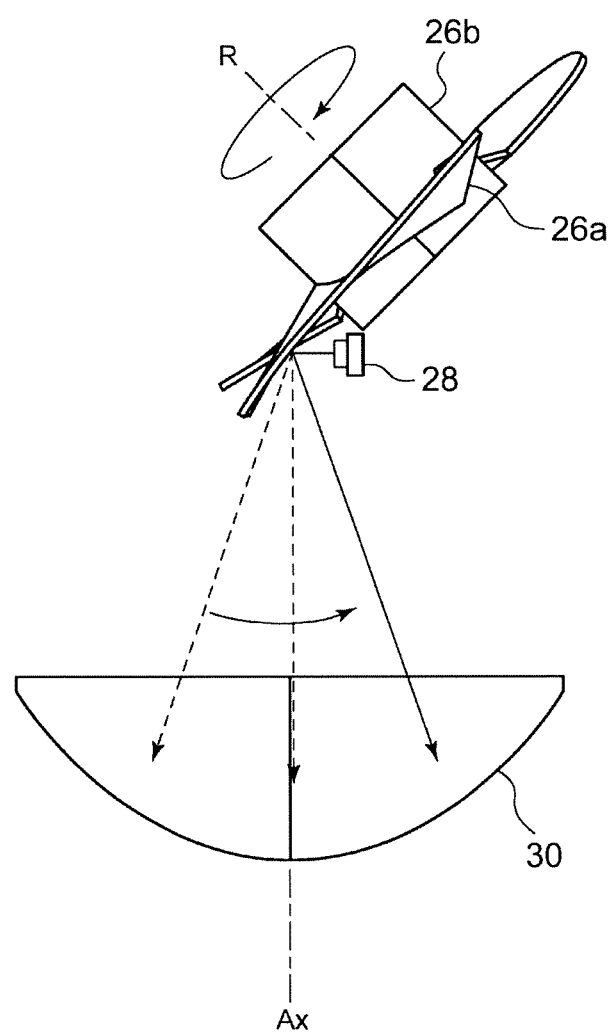
FIG. 2 is a top view schematically showing a configuration of a lamp unit including an optical unit according to the reference example.
Figure 3:
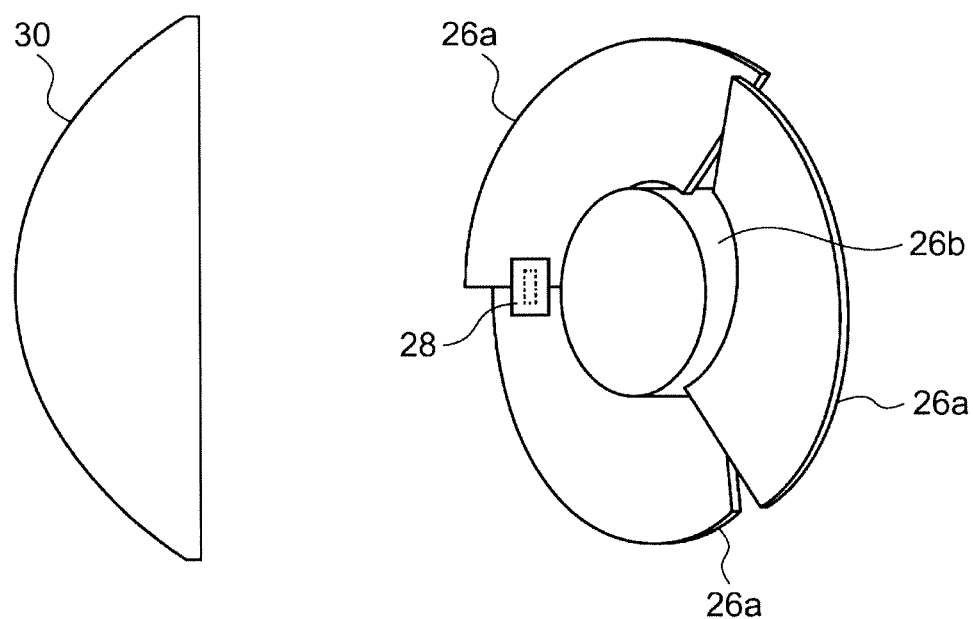
FIG. 3 is a side view of the lamp unit, as seen from the direction "A" shown in FIG. 1.

FIG. 2 is a top view schematically showing a configuration of the lamp unit 20 including the optical unit according to the reference example. FIG. 3 is a side view of the lamp unit 20, as seen from the direction "A" shown in FIG. 1.

The rotary reflector 26 is configured such that three blades 26*a* serving as the reflecting surface and having the same shape are provided around a cylindrical rotating part 26*b*. The rotation axis R of the rotary reflector 26 is oblique to an optical axis Ax and is provided in a plane including the optical axis Ax and the LED 28. In other words, the rotation axis R is provided substantially in parallel with a scanning plane of the light (irradiation beam) of the LED 28 which scans in a right and left direction by rotation. In this way, the thickness of the optical unit can be reduced. Here, the scanning plane can be regarded as a fan-shaped plane that is formed by continuously connecting the locus of the light of the LED 28 that is the scanning light, for example. Further, in the lamp unit 20 according to the reference example, the LED 28 provided is relatively small, and the position where the LED 28 is disposed is located between the rotary reflector 26 and the convex lens 30 and is deviated from the optical axis Ax. Therefore, the dimension in a depth direction (a vehicle front-rear direction) of the vehicle headlamp 10 can be shortened, as compared with the case where a light source, a reflector, and a lens are arranged in a line on an optical axis as in a conventional projector-type lamp unit.

Further, the shapes of the blades 26*a* of the rotary reflector 26 are configured such that a secondary light source of the LED 28 due to reflection is formed near a focal point of the convex lens 30. In addition, each of the blades 26*a* has a shape twisted so that an angle formed by the optical axis Ax and the reflecting surface changes along a circumferential direction around the rotation axis R. In this way, as shown in FIG. 2, the scanning using the light of the LED 28 becomes possible. This point will be described in more detail.

FIGS. 4A to 4E are perspective views showing the states of the blades according to a rotation angle of the rotary reflector 26 in the lamp unit according to the reference example, and FIGS. 4F to 4J are views for explaining that the reflection direction of light from a light source changes in accordance with the states shown in FIGS. 4A to 4E.

Figure 4A:
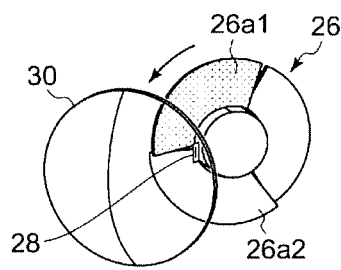
FIGS. 4A to 4E are perspective views showing the states of a blade according to a rotation angle of a rotary reflector in the lamp unit according to the reference example.
Figure 4F:
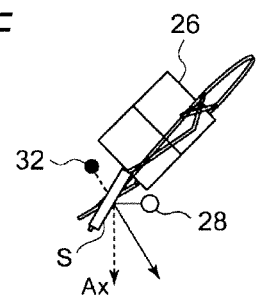
FIGS. 4F to 4J are views for explaining that the reflection direction of light from a light source changes in accordance with the states shown in FIGS. 4A to 4E.
Figure 4B:
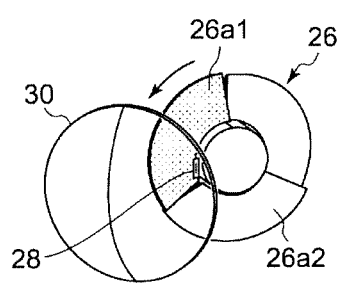
Figure 4G:
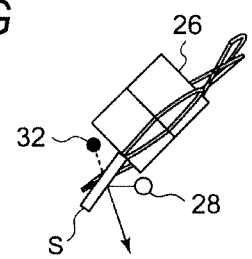

FIG. 4A shows a state in which the LED 28 is disposed so as to irradiate a boundary region between two blades 26*a*1, 26*a*2. In this state, as shown in FIG. 4F, the light of the LED 28 is reflected by a reflecting surface S of the blade 26*a*1 in a direction oblique to the optical axis Ax. As a result, one end region of both right and left end portions among the regions in front of the vehicle where the light distribution pattern is formed is irradiated. Therefore, when the rotary reflector 26 rotates to the state shown in FIG. 4B, the reflecting surface S (reflecting angle) of the blade 26*a*1 reflecting the light of the LED 28 changes because the blade 26*a*1 is twisted. As a result, as shown in FIG. 4G, the light of the LED 28 is reflected in a direction closer to the optical axis Ax than the reflecting direction shown in FIG. 4F.

Figure 4C:
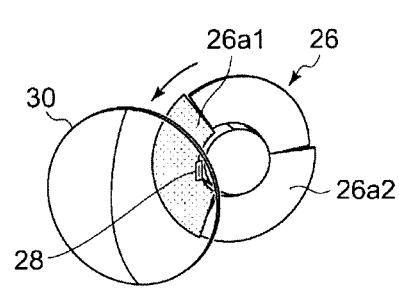
Figure 4H:
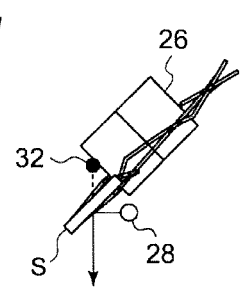
Figure 4D:
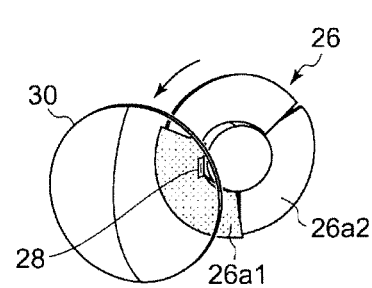
Figure 4I:
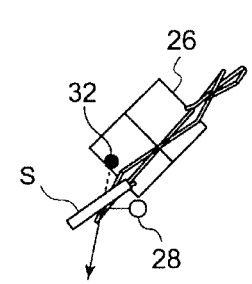
Figure 4E:
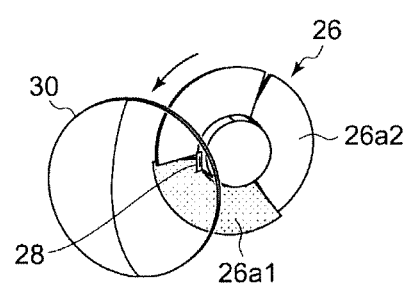
Figure 4J:
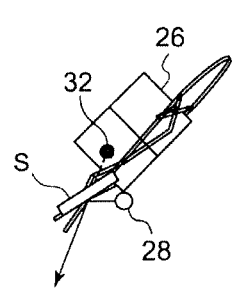
Figure 5A:
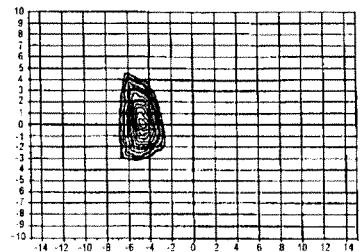
FIGS. 5A to 5E are views showing projection images at scanning positions where the rotary reflector corresponds to the states shown in FIGS. 4F to 4J.
Figure 5B:
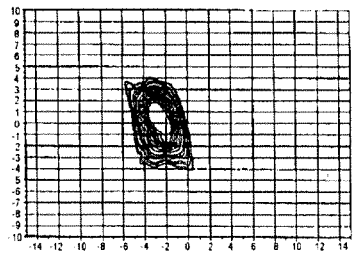
Figure 5C:
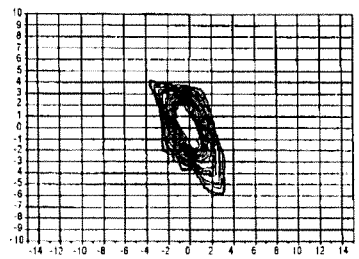
Figure 5D:
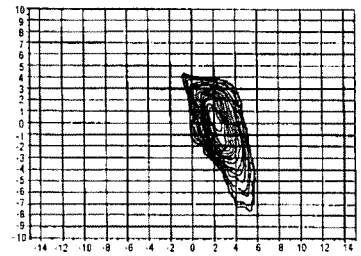
Figure 5E:
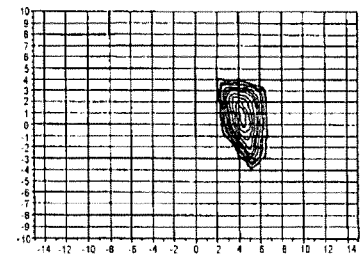

Subsequently, when the rotary reflector 26 is rotated as shown in FIGS. 4C, 4D and 4E, the reflecting direction of the light of the LED 28 changes toward the other end portion of the both right and left end portions among the regions in front of the vehicle where the light distribution pattern is formed. The rotary reflector 26 according to the reference example is configured such that it can scan the front side once in one direction (horizontal direction) by the light of the LED 28 by being rotated by 120 degrees. In other words, as one blade 26*a* passes in front of the LED 28, a desired region in front of the vehicle is scanned once by the light of the LED 28. Meanwhile, as shown in FIGS. 4F to 4J, a secondary light source (light source virtual image) 32 moves right and left near the focal point of the convex lens 30. The number and shape of the blades 26*a* and the rotational speed of the rotary reflector 26 are appropriately set based on the results of experiments or simulations in consideration of required characteristics of the light distribution pattern or the flicker of the image to be scanned. Further, a motor is desirable as a drive unit that can change its rotational speed according to various light distribution control. Thus, it is possible to easily change the scanning timing. As such a motor, a motor capable of obtaining rotation timing information from the motor itself is desirable. Specifically, a DC brushless motor can be used. When the DC brushless motor is used, the rotation timing information can be obtained from the motor itself, and thus, equipment such as an encoder can be omitted.

In this way, the rotary reflector 26 according to the reference example can scan the front side of the vehicle in the right and left direction using the light of the LED 27 by devising the shape and rotational speed of the blade 26*a*. FIGS. 5A to 5E are views showing projection images at scanning positions where the rotary reflector corresponds to the states shown in FIGS. 4F to 4J. The units on the vertical axis and the horizontal axis in these figures are degrees (°), which indicate the irradiation range and the irradiation position. As shown in FIGS. 5A to 5E, the rotation of the rotary reflector 26 causes the projection image to move in the horizontal direction.

Figure 6A:
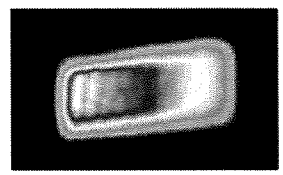
FIG. 6A is a view showing a light distribution pattern when a range of ±5 degrees in a right and left direction with respect to an optical axis is scanned using the vehicle headlamp according to the reference example.
Figure 6C:
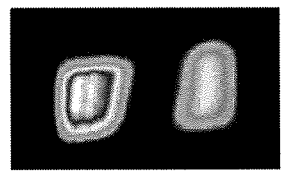
FIG. 6C is a view showing a state in which one portion of the light distribution pattern is shielded using the vehicle headlamp according to the reference example.
Figure 6E:
FIG. 6E is a view showing a state in which a plurality of portions of the light distribution pattern is shielded using the vehicle headlamp according to the reference example.
Figure 6B:
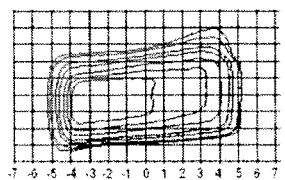
FIG. 6B is a view showing the luminous intensity distribution of the light distribution pattern shown in FIG. 6A.
Figure 6D:
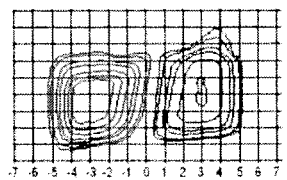
FIG. 6D is a view showing the luminous intensity distribution of the light distribution pattern shown in FIG. 6C.
Figure 6F:
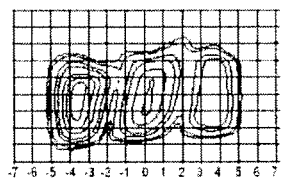
FIG. 6F is a view showing the luminous intensity distribution of the light distribution pattern shown in FIG. 6E.

FIG. 6A is a view showing the light distribution pattern when a range of ±5 degrees in the right and left direction with respect to the optical axis is scanned using the vehicle headlamp according to the reference example, FIG. 6B is a view showing the luminous intensity distribution of the light distribution pattern shown in FIG. 6A, FIG. 6C is a view showing a state in which one portion of the light distribution pattern is shielded using the vehicle headlamp according to the reference example, FIG. 6D is a view showing the luminous intensity distribution of the light distribution pattern shown in FIG. 6C, FIG. 6E is a view showing a state in which a plurality of places of the light distribution pattern is shielded using the vehicle headlamp according to the reference example, and FIG. 6F is a view showing the luminous intensity distribution of the light distribution pattern shown in FIG. 6E.

As shown in FIG. 6A, the vehicle headlamp 10 according to the reference example reflects the light of the LED 28 by the rotary reflector 26 and scans the front side with the reflected light, thereby forming a high-beam light distribution pattern that is laterally elongated substantially in the horizontal direction. In this way, since a desired light distribution pattern can be formed by rotation in one direction of the rotary reflector 26, driving by a special mechanism such as a resonance mirror is not necessary and restrictions on the size of the reflecting surface are small like the resonance mirror. Therefore, by selecting the rotary reflector 26 having a larger reflecting surface, the light emitted from the light source can be efficiently used for illumination. That is, the maximum light intensity in the light distribution pattern can be increased. Meanwhile, the rotary reflector 26 according to the reference example has substantially the same diameter as the convex lens 30, and the area of the blade 26*a* can be increased accordingly.

Further, the vehicle headlamp 10 including the optical unit according to the reference example can form a high-beam light distribution pattern in which an arbitrary region is shielded as shown in FIGS. 6C and 6E by synchronizing the timing of the turning on/off of the LED 28 and the changes in the light-emission luminous intensity with the rotation of the rotary reflector 26. Further, when the high-beam light distribution pattern is formed by changing (turning on/off the LED) the light-emission luminous intensity of the LED 28 in synchronous with the rotation of the rotary reflector 26, it is also possible to perform a control of swiveling the light distribution pattern itself by deviating the phase of the changes in the luminous intensity.

As described above, in the vehicle headlamp according to the reference example, the light distribution pattern is formed by scanning the light of the LED, and the light-shielding portion can be arbitrarily formed on a part of the light distribution pattern by controlling the changes in the light-emission luminous intensity. Therefore, it is possible to precisely shield a desired region by a small number of LEDs, as compared to the case where the light-shielding portion is formed by turning off some of a plurality of LEDs. Further, since the vehicle headlamp 10 can form a plurality of light-shielding portions, it is possible to shield the region corresponding to each vehicle even when a plurality of vehicles is present in front.

Further, since the vehicle headlamp 10 can perform the light-shielding control without moving the basic light distribution pattern, it is possible to reduce the sense of discomfort given to a driver during the light-shielding control. Further, since the light distribution pattern can be swiveled without moving the lamp unit 20, the mechanism of the lamp unit 20 can be simplified. Therefore, the vehicle headlamp 10 only needs to include a motor necessary for the rotation of the rotary reflector 26 as a drive part for variable light distribution control, so that the simplified configuration, the cost reduction and the miniaturization can be achieved.

(First Embodiment)

As in the optical unit according to the above-described reference example, it is possible to form a high-beam light distribution pattern with a single light source. However, a case where a brighter irradiation pattern is required or a case where an LED of a low luminous intensity is used for cost reduction is also conceivable. Therefore, in the present embodiment, an optical unit having a plurality of light sources will be descried.

Figure 7:
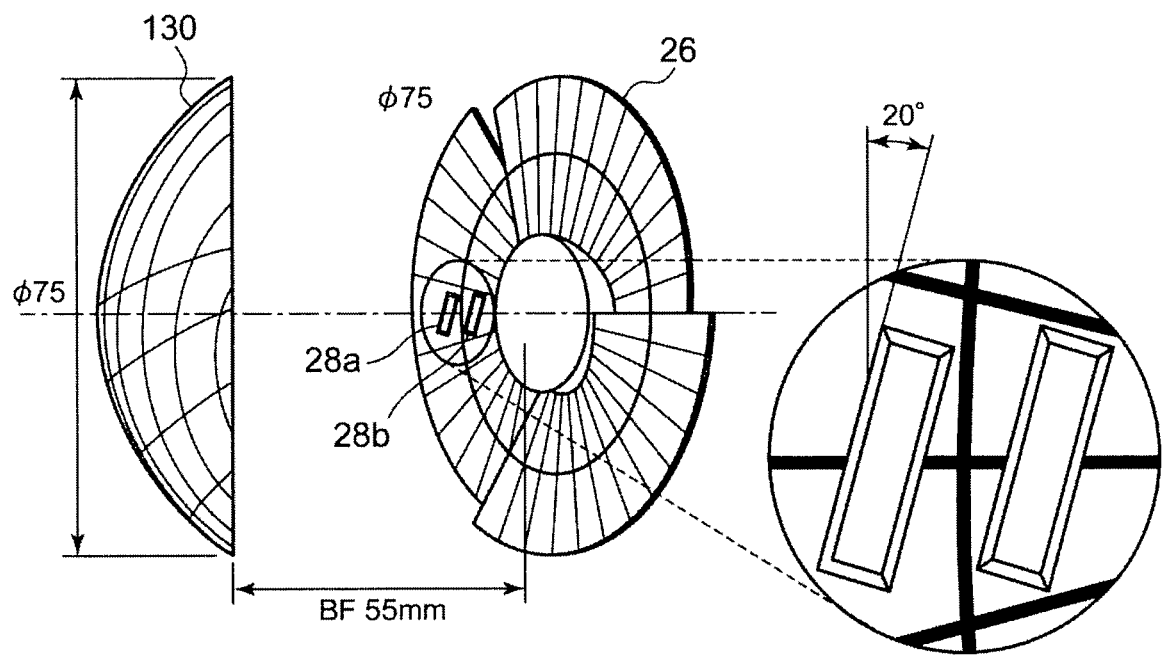
FIG. 7 is a side view schematically showing a lamp unit according to a first embodiment.
Figure 8:
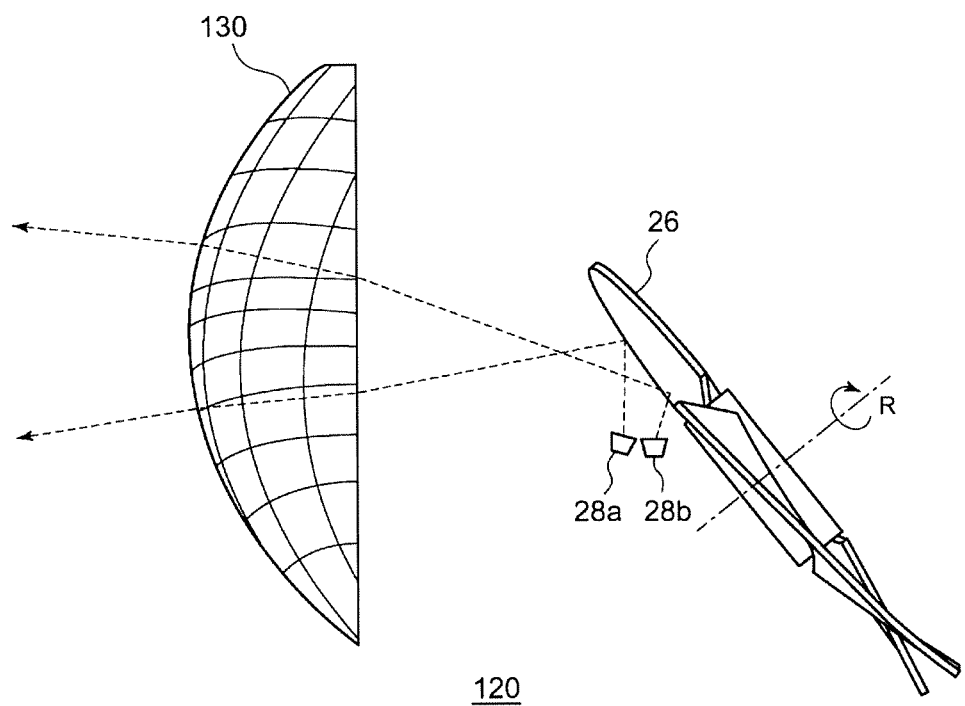
FIG. 8 is a top view schematically showing the lamp unit according to the first embodiment.
Figure 9:
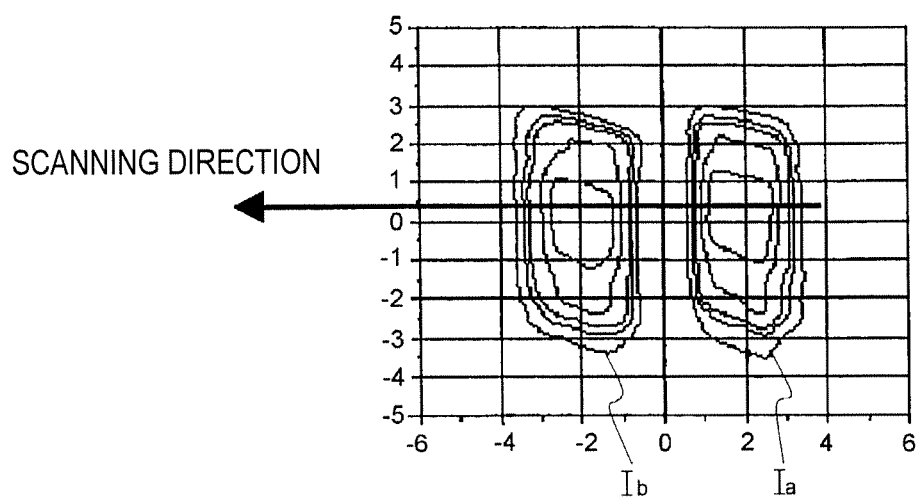
FIG. 9 is a view showing a projected image when a rotary reflector is in a state shown in FIG. 7.

FIG. 7 is a side view schematically showing a lamp unit according to a first embodiment. FIG. 8 is a top view schematically showing the lamp unit according to the first embodiment. A lamp unit 120 according to the first embodiment includes a projection lens 130, a rotary reflector 26, and two LEDs 28a, 28b. FIG. 9 is a view showing a projected image when the rotary reflector 26 is in a state shown in FIG. 7. A projected image Ia is formed by the light of the LED 28a disposed on the front side close to the projection lens 130, and a projected image Ib is formed by the light of the LED 28b disposed on the rear side away from the projection lens 130.

Figure 10A:
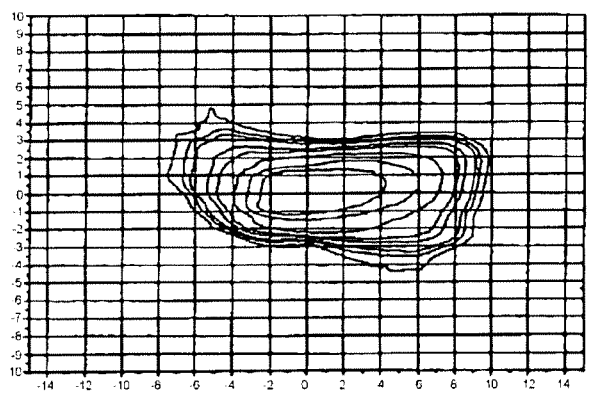
FIG. 10A is a view showing an irradiation pattern formed by a front LED.
Figure 10B:
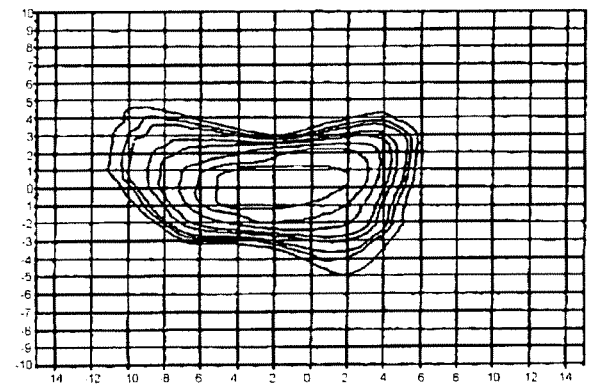
FIG. 10B is a view showing an irradiation pattern formed by a rear LED.
Figure 10C:
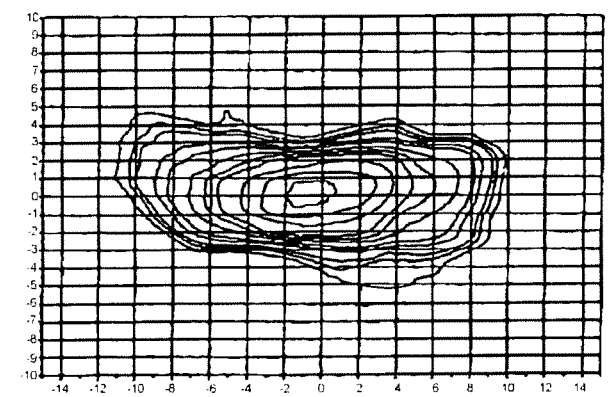
FIG. 10C is a view showing a combined light distribution pattern formed by two LEDs.

FIG. 10A is a view showing an irradiation pattern formed by the front LED 28a, FIG. 10B is a view showing an irradiation pattern formed by the rear LED 28b, and FIG. 10C is a view showing a combined light distribution pattern formed by two LEDs. As shown in FIG. 10C, a desired light distribution pattern can be also formed by using a plurality of LEDs. Further, in the combined light distribution pattern, the maximum luminous intensity difficult to be achieved by only one LED can be also achieved.

Figure 11A:
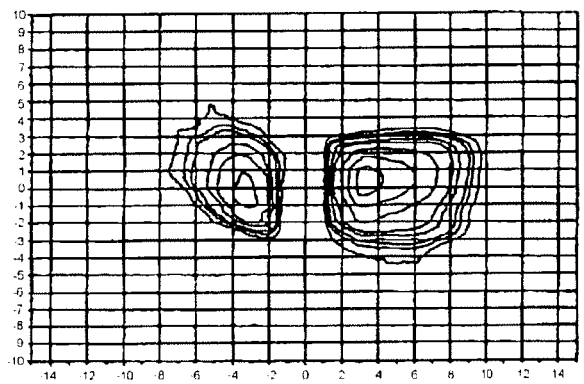
FIG. 11A is a view showing an irradiation pattern having a light-shielding portion formed by a front LED.
Figure 11B:
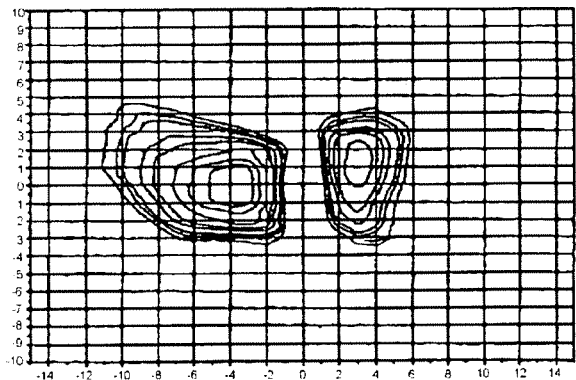
FIG. 11B is a view showing an irradiation pattern having a light-shielding portion formed by a rear LED.
Figure 11C:
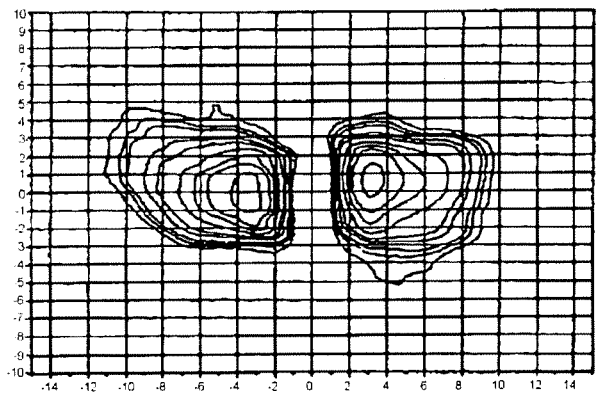
FIG. 11C is a view showing a combined light distribution pattern having a light-shielding portion formed by two LEDs.

Subsequently, a case where a light-shielding portion is formed in a light distribution pattern by using the lamp unit 120 will be described. FIG. 11A is a view showing an irradiation pattern having a light-shielding portion formed by the front LED 28a, FIG. 11B is a view showing an irradiation pattern having a light-shielding portion formed by the rear LED 28b, and FIG. 11C is a view showing a combined light distribution pattern having a light-shielding portion formed by two LEDs. In order to form the light distribution patterns shown in FIGS. 11A and 11B, the timings of the turning on/off of the respective LEDs are appropriately deviated from each other so as to align the positions of the respective light-shielding portions. As shown in FIG. 11C, a desired light distribution pattern having a light-shielding portion can be also formed by using a plurality of LEDs. Further, in the combined light distribution pattern, the maximum luminous intensity difficult to be achieved by only one LED can be also achieved, and a wider area can be irradiated.

(Second Embodiment)

Figure 12:
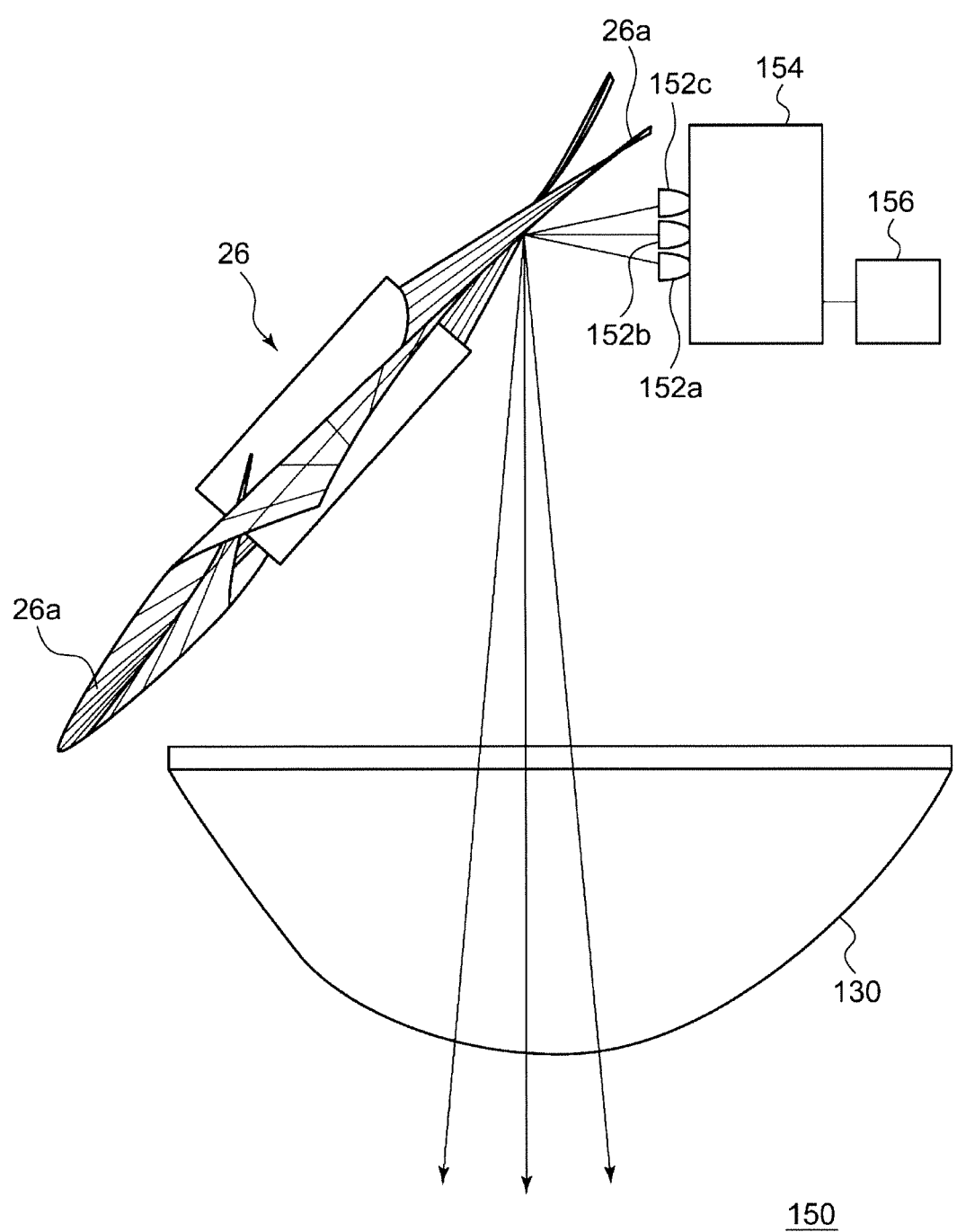
FIG. 12 is a top view schematically showing a configuration including an optical unit according to a second embodiment.

FIG. 12 is a top view schematically showing a configuration including an optical unit according to a second embodiment.

An optical unit 150 shown in FIG. 12 includes an LED unit 152a as a first light source for emitting a first irradiation beam, an LED unit 152b as a second light source for emitting a second irradiation beam, an LED unit 152c as a third light source for emitting a third irradiation beam, the rotary reflector 26, a control part 154 for controlling the light emission intensity of the LED units 152a, 152b, 152c, and a detection part 156 for detecting a travelling state of own vehicle and a state in front of the own vehicle. The rotary reflector 26 rotates in one direction around its rotation axis while reflecting the respective lights emitted from the LED units 152a to 152c. The detection part 156 is, for example, a car navigation system or the like including a camera, a radar, a vehicle speed sensor, a steering angle sensor, an actinometer, and a GPS.

Figure 13A:
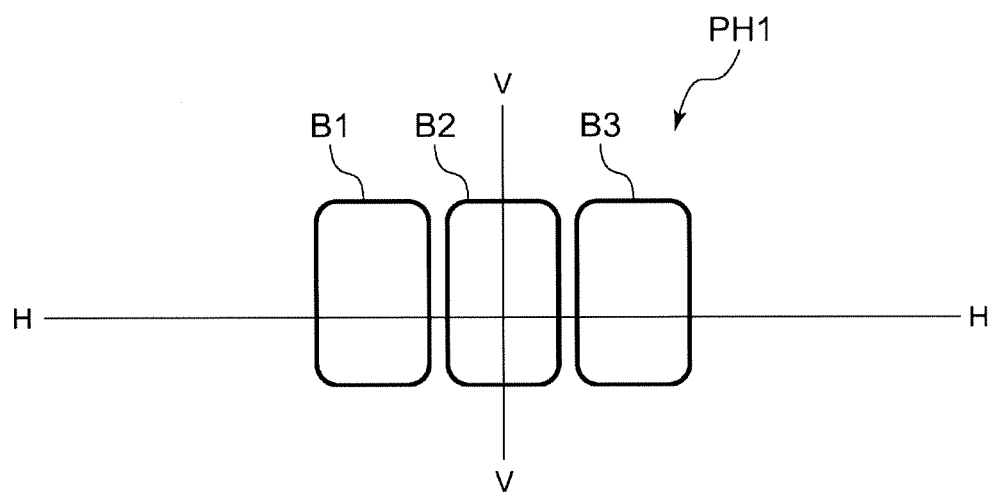
FIG. 13A is a schematic view showing a light distribution pattern PH1 formed when an LED unit is turned on in a state where the rotary reflector is stopped.
Figure 13B:
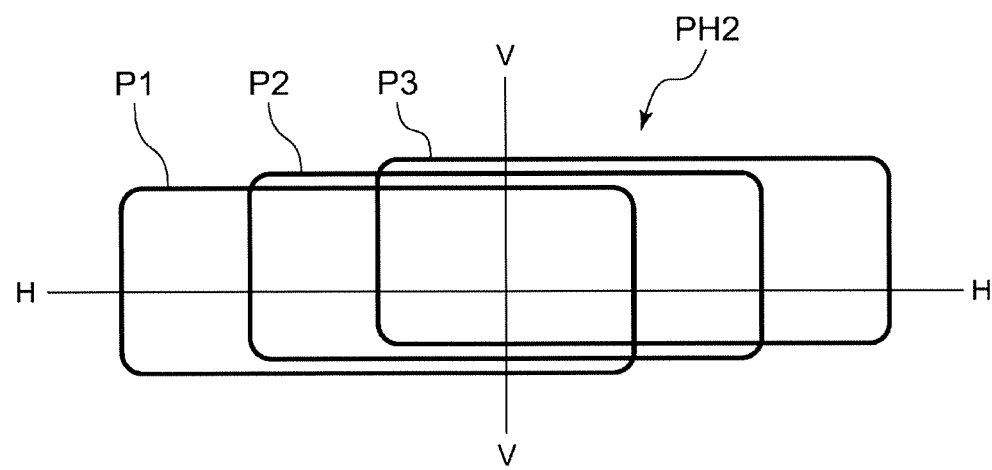
FIG. 13B is a schematic view showing a light distribution pattern PH2 formed when an LED unit is turned on in a state where the rotary reflector is rotated.

FIG. 13A is a schematic view showing a light distribution pattern PH1 formed when the LED units 152a, 152b, 152c are turned on in a state where the rotary reflector 26 is stopped, and FIG. 13B is a schematic view showing a light distribution pattern PH2 formed when the LED units 152a, 152b, 152c are turned on in a state where the rotary reflector 26 is rotated.

The light distribution pattern PH1 shown in FIG. 13A is obtained by overlapping and combining a first irradiation beam B1 emitted from the LED unit 152a, a second irradiation beam B2 emitted from the LED unit 152b, and a third irradiation beam B3 emitted from the LED unit 152c.

As shown in FIG. 13B, the rotary reflector 26 forms a first irradiation pattern P1 by scanning the first irradiation beam B1 emitted from the LED unit 152a, forms a second irradiation pattern P2 by scanning the second irradiation beam B2 emitted from the LED unit 152b, forms a third irradiation pattern P3 by scanning a third irradiation beam B3 emitted from the LED unit 152c, and forms a high-beam light distribution, pattern PH2 by overlapping the first irradiation pattern P1 to the third irradiation pattern P3.

By controlling the turning on/off of the LED units 152a, 152b, 152c, the optical unit 150 according to the present embodiment can also form a light distribution pattern partially shielded as shown in FIG. 6.

Figure 14A:
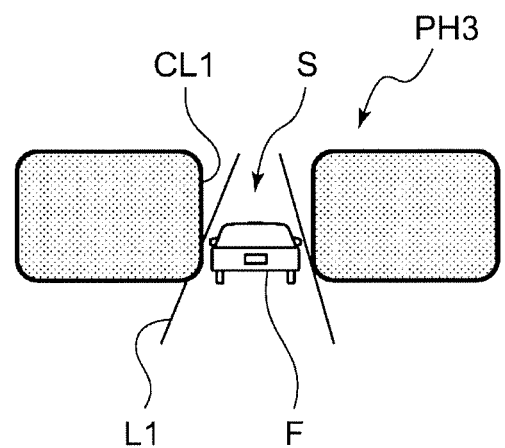
FIG. 14A is a view showing an irradiation state by a light-shielding light distribution pattern in the case where a forward vehicle is present in front of a vehicle while travelling on a straight road.
Figure 14B:
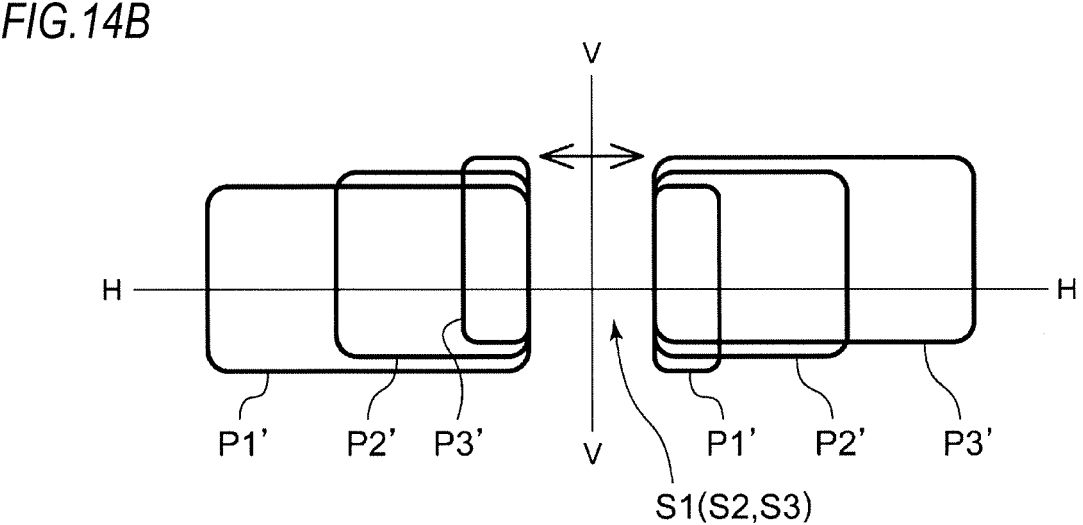
FIG. 14B is a schematic view for explaining the light-shielding light distribution pattern shown in FIG. 14A.

FIG. 14A is a view showing an irradiation state by a light-shielding light distribution pattern in the case where a forward vehicle is present in front of a vehicle while travelling on a straight road, and FIG. 14B is a schematic view for explaining the light-shielding light distribution pattern shown in FIG. 14A.

As shown in FIG. 14A, it is expected that the amount of movement in a right and left direction of a forward vehicle F travelling on a straight road L1 is small. Therefore, it is preferable to maximally narrow a light-shielding range S so as to irradiate up to the vicinity of the both sides of the forward vehicle F. Further, the timing of the turning on/off of the respective LED units is controlled such that a vertical cut line CL1 which is a boundary of the light-shielding portion S appears sharper.

Specifically, as shown in FIG. 14B, the control part 154 controls the timing of changing the light emission intensity of the LED units 152a to 152c so that a first irradiation pattern P1' in which a first light-shielding portion S1 is formed is formed, a second irradiation pattern P2' in which a second light-shielding portion S2 is formed is formed, a third irradiation pattern P3' in which a third light-shielding portion S3 is formed is formed, and the respective ranges of the first light-shielding portion S1 to the third light-shielding portion S3 substantially coincide with each other.

Figure 15A:
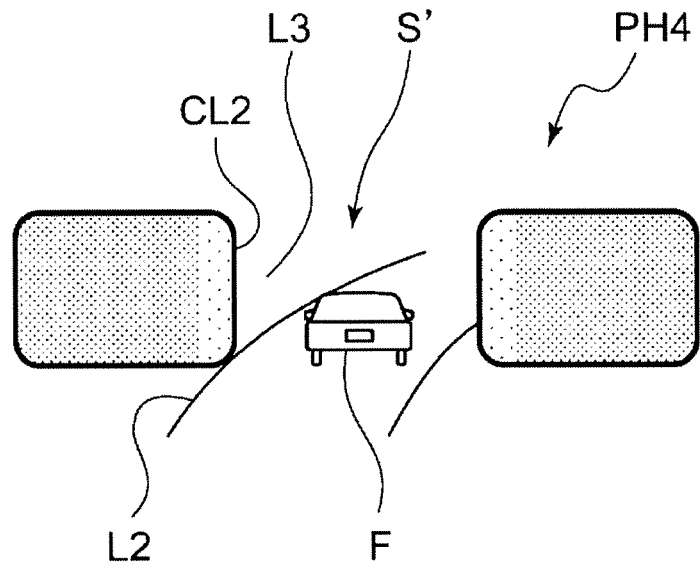
FIG. 15A is a view showing an irradiation state by a light-shielding light distribution pattern in the case where a forward vehicle is present in front of a vehicle while travelling on a curved road.
Figure 15B:
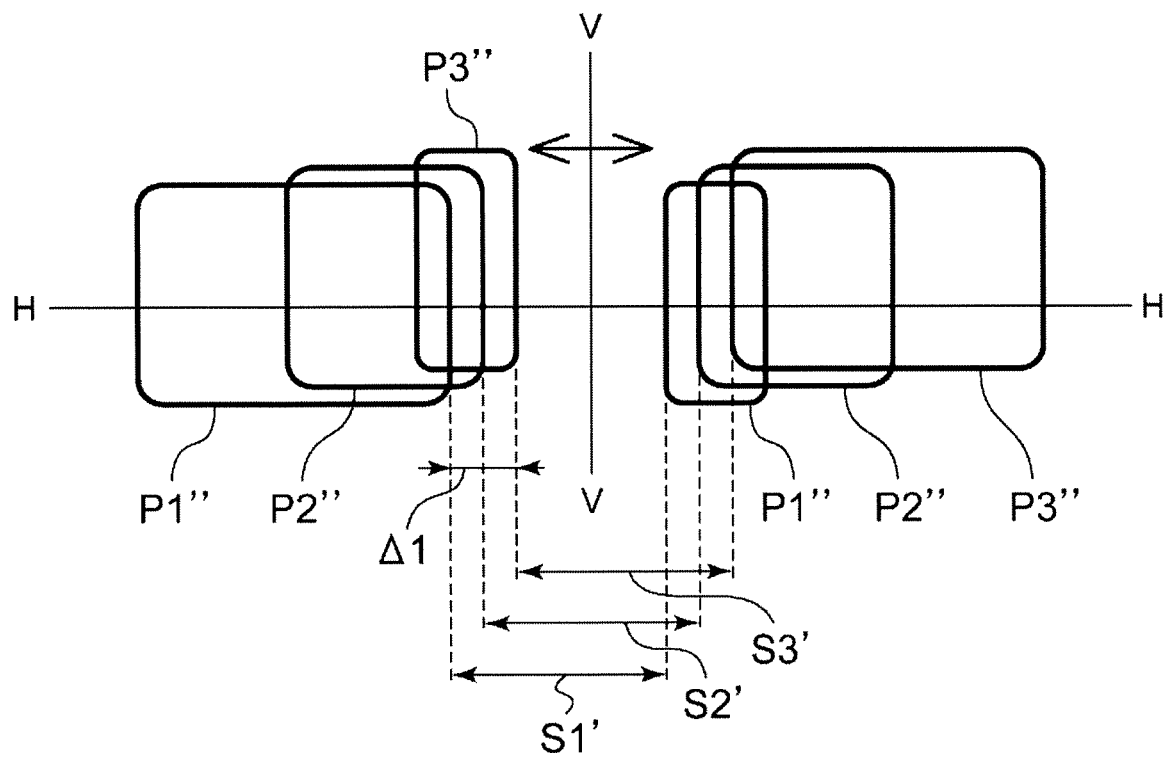
FIG. 15B is a schematic view for explaining the light-shielding light distribution pattern shown in FIG. 15A.

FIG. 15A is a view showing an irradiation state by a light-shielding light distribution pattern in the case where a forward vehicle is present in front of a vehicle while travelling on a curved road, and FIG. 15B is a schematic view for explaining the light-shielding light distribution pattern shown in FIG. 15A.

As shown in FIG. 15A, it is expected that the amount of movement in the right and left direction of the forward vehicle F travelling on a curved road L2 is large. Therefore, when the light is irradiated up to the vicinity of both sides of the forward vehicle F, there is a possibility of giving a glare to an occupant of the forward vehicle F. Further, when a vertical cut line CL2 which is a boundary of a light-shielding portion S' is too sharp, there is a possibility that a driver feels a sense of discomfort when the light is projected onto a shoulder L3. Therefore, the timing of the turning on/off of the respective LED units is controlled so that the vertical cut line CL2 is blurred.

Specifically, as shown in FIG. 15B, the control part 154 controls the timing of controlling the light emission intensity of the LED units 152a to 152c so that a first irradiation pattern P1' in which a first light-shielding portion S1' is formed, a second irradiation pattern P2' in which a second light-shielding portion S2' is formed, and a third irradiation pattern P3' in which a third light-shielding portion S3' is formed are formed, and the respective ranges of the first light-shielding portion S1' to the third light-shielding portion S3' are deviated from each other.

In this way, although the regions adjacent to both ends of the light-shielding portion S' are scanned only by either the first irradiation beam B1 or the third irradiation beam B3, the outside thereof is scanned with a plurality of scanning beams. Therefore, the change in brightness in the vicinity of the bright/dark boundary of the light-shielding portion S' can be made in a stepwise manner. Here, the change in brightness is, for example, a function of a change in brightness with respect to a change in position of the scanning direction in the light distribution pattern.

Further, the control part 154 is configured to be capable of executing a first light-shielding mode (see FIG. 15B) in which a deviation $\Delta 1$ of the range of the first light-shielding portion S1' to the range of the third light-shielding portion S3' is relatively large, and a second light-shielding mode (see FIG. 14B) in which a deviation $\Delta 2$ ($\Delta 2<\Delta 1$) of the range of the first light-shielding portion S1 to the range of the third light-shielding portion S3 is relatively small. In the example of FIG. 14B, the deviation $\Delta 2$ is almost zero ($\Delta 2 \approx 0$) and not shown since the respective ranges of the first light-shielding portion S1 to the third light-shielding portion S3 substantially coincide with each other. In this way, the change in brightness in the vicinity of the bright/dark boundary of the light-shielding portion can be made relatively small in the first light-shielding mode and can be made relatively large in the second light-shielding mode.

The control part 154 is configured to be capable of executing the first light-shielding mode or the second light-shielding mode in accordance with the travelling state of the own vehicle or the state in front of the own vehicle, which is acquired on the basis of the information acquired by the detection part 156. For example, the control part 154 is configured to determine whether it is a straight road or a curved road from the road shape information or the steering wheel's steering angle information or the like acquired by the detecting part 156, and to select the first light-shielding mode or the second light-shielding mode based on the determination results. In this way, the change (sharpness of the vertical cut line) in brightness in the vicinity of the bright/dark boundary of the light-shielding portion can be made different in accordance with the situation in which the optical unit 150 is used.

Meanwhile, the optical unit 150 according to the second embodiment uses three LED units as a light source. However, even when two LED units are used as described in the first embodiment, the above-described operational effects are achieved.

Therefore, in other words, the optical unit according to the above-described embodiment can be also expressed as follows. The optical unit 150 according to the present embodiment is an optical unit that forms a light distribution pattern by scanning the light respectively emitted from a plurality of light sources. The optical unit 150 forms the light-shielding portion in a part of the light distribution pattern by controlling the timing of turning of/off the light sources. The optical unit 150 forms a light distribution pattern so that it becomes gradually brighter away from the light-shielding portion (see FIG. 15B).

In this way, since the light is scanned to the regions adjacent to both ends of the light-shielding portion so that it becomes gradually brighter away from the light-shielding portion, the change in brightness in the vicinity of the bright/dark boundary of the light-shielding portion can be made in a stepwise manner.

Meanwhile, when forming a light distribution pattern having a light-shielding portion, before and after the irradiation beam passes through the region corresponding to the vertical cut line, not only each LED unit may be suddenly maximally turned on or fully turned off, but also the light amount of each LED unit may be changed stepwise or continuously.

(Third Embodiment)

In a third embodiment, positioning between the rotary reflector and the motor driving the rotary reflector will be described. As described above, in an optical system that forms a light distribution pattern by scanning a light source image by using the rotary reflector 26, it is necessary to synchronize the timing of turning on/off the light sources and the rotation timing of the blade 26a that is a reflective mirror of the rotary reflector 26. To that end, it is necessary to previously know the positional relationship between the blade 26a and the rotation position of the motor from which the pulse signal corresponding to the rotation of the motor is output. As the motor, a DC brushless motor or a DC motor with a brush can be adopted.

The pulse signal corresponding to the rotation of the motor is generated when the boundary where the magnet of the motor changes from N pole to S pole (or from S pole to N pole) passes through a Hall sensor. Therefore, as one method, a mark is attached to a rotation shaft of the motor so that the boundary of magnetization can be confirmed from the outside of the motor.

Figure 16A:
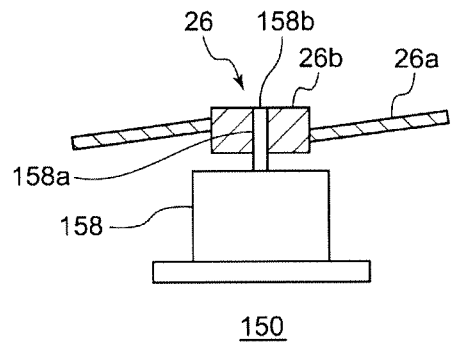
FIG. 16A is a schematic view of an optical unit according to a third embodiment as seen from the side.
Figure 16B:
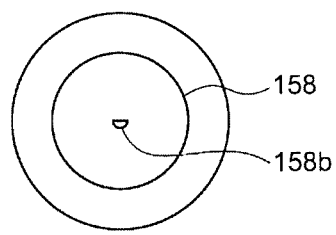
FIG. 16B is a schematic view of a motor shown in FIG. 16A as seen from above.
Figure 16C:
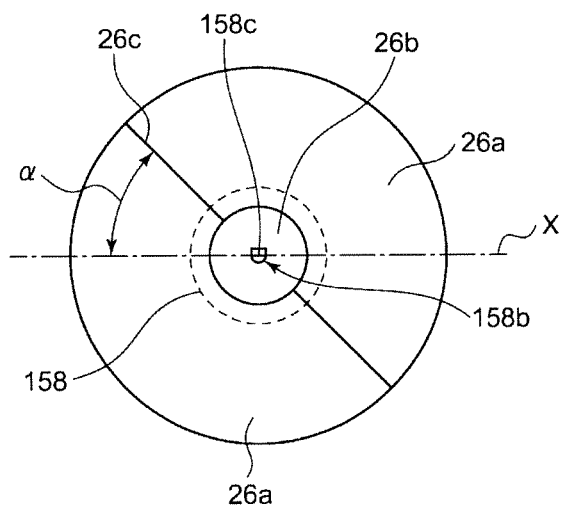
FIG. 16C is a schematic view of the optical unit according to the third embodiment as seen from above.

FIG. 16A is a schematic view of an optical unit according to the third embodiment as seen from the side, FIG. 16B is a schematic view of a motor shown in FIG. 16A as seen from above, and FIG. 16C is a schematic view of the optical unit according to the third embodiment as seen from above.

The optical unit 150 includes the rotary reflector 26 and a motor 158. The motor 158 has a rotation shaft 158a. A leading end 158b of the rotation shaft 158a is processed into a D-cut shape so as to be fitted into a hole formed in the rotating part 26b of the rotary reflector 26. Meanwhile, the shape of the leading end 158b may be an I-cut shape. Then, a flat portion 158c of the D-cut shape of the leading end 158b is set to be parallel to a boundary line X of magnetization. In this way, a boundary position of magnetization can be easily recognized from the outside of the motor 158.

In the rotary reflector 26, a hole corresponding to the D-cut shape of the leading end 158b of the rotation shaft 158a is formed in a predetermined positional relationship (angle α) with a boundary 26c of the blade 26a. In this way, by inserting the leading end 158b of the motor 158 into the hole of the rotary reflector 26, the position of the blade 26a of the rotary reflector 26 and the position of magnetization of the motor 158 (the position where a pulse is output from a Hall sensor) can be precisely matched.

Figure 17A:
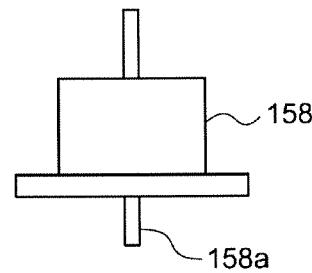
FIG. 17A is a side view of a motor according to a modification.
Figure 17B:
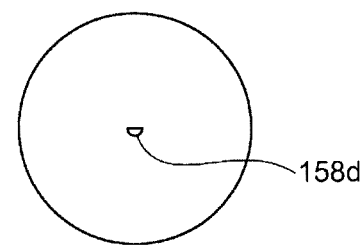
FIG. 17B is a bottom view of the motor shown in FIG. 17A.
Figure 17C:
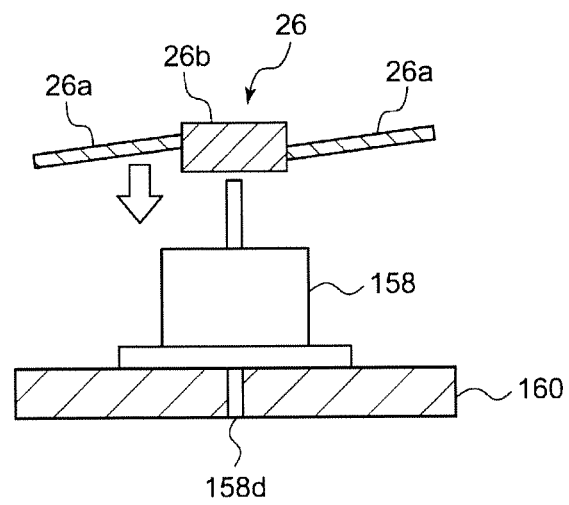
FIG. 17C is a schematic view for explaining the assembling of the motor and a rotary reflector according to the modification.

Subsequently, a modification of the alignment between the rotary reflector 26 and the motor 158 will be described. FIG. 17A is a side view of a motor according to a modification, FIG. 17B is a bottom view of the motor shown in FIG. 17A, and FIG. 17C is a schematic view for explaining the assembling of the motor and a rotary reflector according to the modification.

When it is difficult to provide a hole of a special shape such as the D-cut shape in the rotation part 26b of the rotary reflector 26, the rotation shaft 158a of the motor 158 may be extended downward and positioned with respect to the rotary reflector 26 via a jig. For example, as shown in FIGS. 17A and 17B, a lower leading end 158D of the rotation shaft 158a penetrating through the motor 158 has a D-cut shape and is inserted into the hole of a jig 160 corresponding to the D-cut shape, so that the positioning of the motor 158 and the jig 160 is performed. Then, by positioning the rotary reflector 26 with respect to the jig 160 (e.g., by abutting the blade 26a against a part of the jig 160), the position of the blade 26a of the rotary reflector 26 and the magnetization position of the motor 158 can be precisely positioned.

Hereinabove, the present invention has been described with reference to each of the above-described embodiments. However, the present invention is not limited to each of the above-described embodiments, but a suitable combination or substitution for the configurations of the embodiment is also intended to be included in the present invention. Further, based on the knowledge of those skilled in the art, the combination or the order of processing in each embodiment can be appropriately changed or a modification such as various design changes can be added to each embodiment. An embodiment to which such modification is added can be also included to the scope of the present invention.

The invention claimed is:

1. An optical unit comprising:
a first light source configured to emit a first irradiation beam;
a second light source configured to emit a second irradiation beam;
a scanning part configured to form a first irradiation pattern by scanning the first irradiation beam, form a second irradiation pattern by scanning the second irradiation beam, and form a light distribution pattern by overlapping the first irradiation pattern and the second irradiation pattern, and
a control part configured to control light emission intensity of the first light source and light emission intensity of the second light source,
wherein the control part controls a timing of changing the light emission intensity of the first light source and a timing of changing the light emission intensity of the second light source such that a first light-shielding portion is formed in a part of the first irradiation pattern, a second light-shielding portion is formed in a part of the second irradiation pattern so as to overlap with the first light-shielding portion, and a range of the first light-shielding portion and a range of the second light-shielding portion are deviated from each other,
wherein the first irradiation pattern comprises a first irradiated left portion and a first irradiated right portion separated by the first light-shielding portion,
wherein the second irradiation pattern comprises a second irradiated left portion and a second irradiated right portion separated by the second light-shielding portion,
wherein the first irradiation pattern comprising the first irradiated left portion and the first irradiated right portion is formed by only the first light source, and
wherein the second irradiation pattern comprising the second irradiated left portion and the second irradiated right portion is formed by only the second light source.

2. The optical unit according to claim 1,
wherein the control part is configured to be capable of executing:
a first light-shielding mode in which a deviation of the range of the first light-shielding portion and the range of the second light-shielding portion is relatively large; and
a second light-shielding mode in which a deviation of the range of the first light-shielding portion and the range of the second light-shielding portion is relatively small.

3. The optical unit according to claim 2,
wherein the control part is configured to be capable of executing the first light-shielding mode or the second light-shielding mode in accordance with a travelling state of an own vehicle or a state in front of the own vehicle.

4. The optical unit according to claim 3,
wherein the scanning part comprises a rotary reflector that rotates in one direction around its rotation axis while reflecting light emitted from the first light source and the second light source.

5. The optical unit according to claim 2,
wherein the scanning part comprises a rotary reflector that rotates in one direction around its rotation axis while reflecting light emitted from the first light source and the second light source.

6. The optical unit according to claim 1,
wherein the scanning part comprises a rotary reflector that rotates in one direction around its rotation axis while reflecting light emitted from the first light source and the second light source.

7. The optical unit according to claim 1,
wherein the first irradiation pattern and the second irradiation pattern are in a visible spectrum.

8. An optical unit, comprising:
a plurality of light sources; and
a scanning part configured to:
   form a light distribution pattern by scanning light respectively emitted from the plurality of light sources,
   form a light-shielding portion in a part of the light distribution pattern by a control part controlling a timing of turning on/off the light sources, and
   form the light distribution pattern to be gradually brighter farther away from the light-shielding portion,
wherein the light distribution pattern is formed by overlapping a first irradiation pattern formed by a first light source of the plurality of light sources and a second irradiation pattern formed by a second light source of the plurality of light sources,
wherein the control part controls a timing of changing the light emission intensity of the first light source and a timing of changing the light emission intensity of the second light source such that a first light-shielding portion is formed in a part of the first irradiation pattern, a second light-shielding portion is formed in a part of the second irradiation pattern so as to overlap with the first light-shielding portion, and a range of the first light-shielding portion and a range of the second light-shielding portion are deviated from each other,
wherein the first irradiation pattern comprises a first irradiated left portion and a first irradiated right portion separated by the first light-shielding portion,
wherein the second irradiation pattern comprises a second irradiated left portion and a second irradiated right portion separated by the second light-shielding portion,
wherein the first irradiation pattern comprising the first irradiated left portion and the first irradiated right portion is formed by only the first light source, and
wherein the second irradiation pattern comprising the second irradiated left portion and the second irradiated right portion is formed by only the second light source.

9. The optical unit according to claim 8,
wherein the light distribution pattern is in a visible spectrum.

* * * * *